(12) United States Patent
Opaluch et al.

(10) Patent No.: US 8,500,099 B2
(45) Date of Patent: Aug. 6, 2013

(54) METHODS AND DEVICES FOR THE INSTALLATION OF THE FIBER OPTIC CABLE TO A HOUSE OR OTHER BUILDING STRUCTURE

(75) Inventors: Robert E. Opaluch, East Providence, RI (US); James P. Dacey, Taunton, MA (US)

(73) Assignees: Verizon Patent and Licensing Inc., Basking Ridge, NJ (US); Verizon New England Inc., Boston, MA (US)

( * ) Notice: Subject to any disclaimer, the term of this patent is extended or adjusted under 35 U.S.C. 154(b) by 1161 days.

(21) Appl. No.: 12/181,105

(22) Filed: Jul. 28, 2008

(65) Prior Publication Data

US 2009/0110358 A1   Apr. 30, 2009

Related U.S. Application Data

(62) Division of application No. 11/696,517, filed on Apr. 4, 2007, now Pat. No. 7,406,241.

(51) Int. Cl.
*H02G 1/08* (2006.01)

(52) U.S. Cl.
USPC .......................... 254/134.3 R; 254/134.3 FT

(58) Field of Classification Search
USPC .................. 254/134.3 R, 134.3 FT, 134.4
See application file for complete search history.

(56) References Cited

U.S. PATENT DOCUMENTS

| 6,379,166 | B1 | 4/2002 | Hagarty et al. | |
| 6,435,727 | B1 | 8/2002 | Fingler et al. | |
| 6,457,874 | B1 | 10/2002 | Clapp, Jr. et al. | |
| 6,543,940 | B2 | 4/2003 | Chu | |
| 6,584,242 | B2 | 6/2003 | Shekel et al. | |
| 6,855,881 | B2 | 2/2005 | Khoshnood | |
| 6,972,377 | B2 * | 12/2005 | Sawyer et al. | 174/135 |
| 7,051,999 | B2 | 5/2006 | Hewitt | |
| 7,093,822 | B2 | 8/2006 | Welker | |
| 7,406,241 | B1 * | 7/2008 | Opaluch et al. | 385/135 |
| 8,087,643 | B2 * | 1/2012 | Turner | 254/134.3 FT |
| 2007/0206780 | A1 | 9/2007 | Kerry et al. | |
| 2009/0110358 | A1 * | 4/2009 | Opaluch et al. | 385/135 |

FOREIGN PATENT DOCUMENTS

JP    2005-164994    6/2005

* cited by examiner

*Primary Examiner* — Lee D Wilson

(57) ABSTRACT

Methods and devices for the installation of a fiber optic cable to a house or other building structure are provided. The method may include identifying a preferred location of a customer through an indication left by the customer either on the interior side or exterior side of a wall, forming a through opening in the wall near or at the preferred location, and installing the in-wall termination device in the opening. The in-wall termination device may include a wall plate for attaching to an interior surface of the wall. The wall plate includes one or more connectors for receiving ends of cables extending from the exterior and connecting those cables to other cables extending through the interior of the building structure. The method may allow for the installation of the cable without requiring the presence of the customer or requiring access to the interior of the building structure.

7 Claims, 9 Drawing Sheets

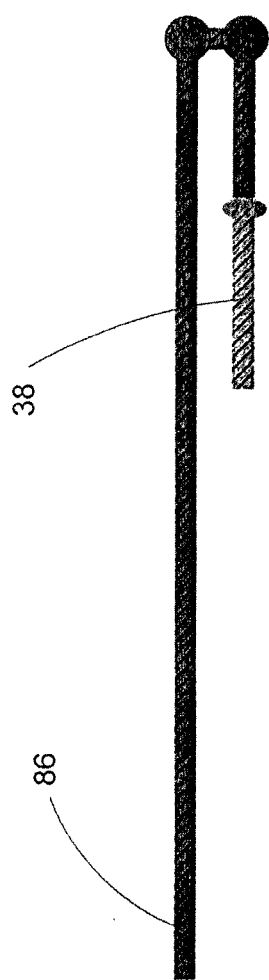
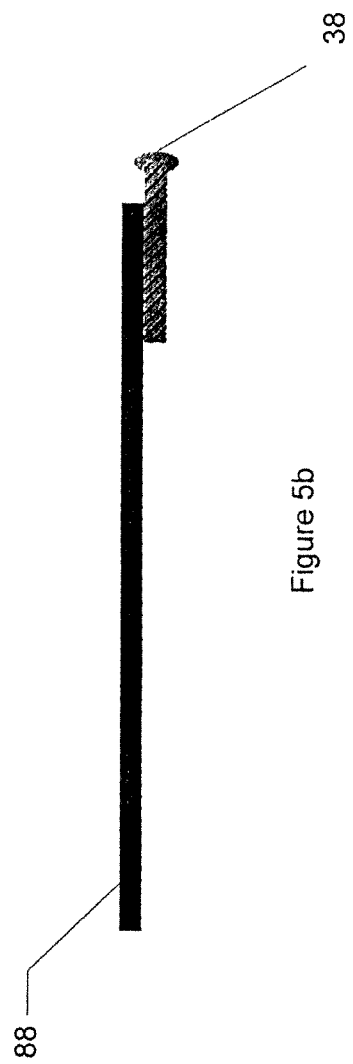

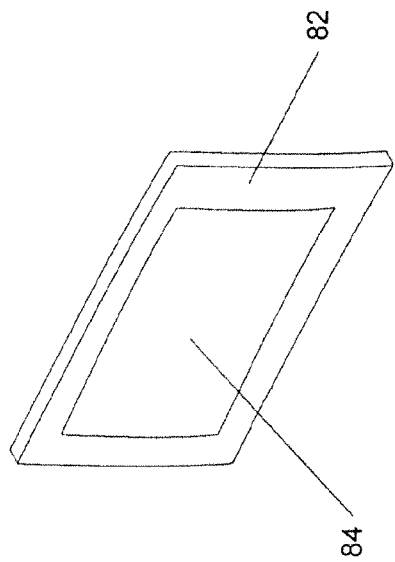
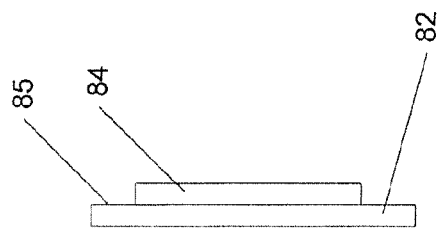
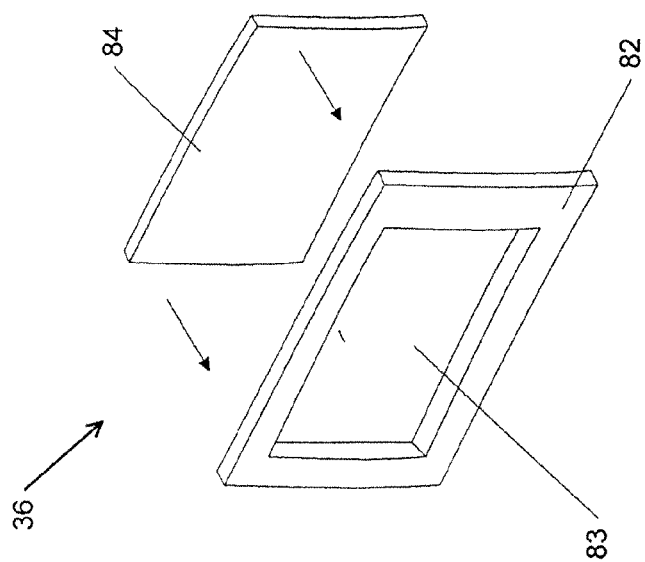
Figure 6b
Figure 6c
Figure 6a

METHODS AND DEVICES FOR THE INSTALLATION OF THE FIBER OPTIC CABLE TO A HOUSE OR OTHER BUILDING STRUCTURE

RELATED APPLICATIONS AND PRIORITY CLAIM

This is a Divisional of prior application Ser. No. 11/696,517, filed Apr. 4, 2007, now U.S. Pat. No. 7,406,241, entitled, "Methods and Devices for the Installation of the Fiber Optic Cable to a House or Other Building Structure," to which priority under 35 U.S.C. §120 is claimed. The entire contents of the aforementioned application are herein expressly incorporated by reference.

BACKGROUND

Some service providers are delivering telephone, television, Internet and other services through fiber optic networks. A fiber optic network may include a fiber optic cable that is run to a customer's home and an optical network terminal (ONT) at or near the home at which the fiber optic cable is terminated. The ONT may be installed on the outside of the house or inside on a wall in the basement, garage, or other room in the house. In some instances, the ONT may be freestanding, i.e., not attached to a wall.

It may take hours for a service provider to install an ONT, run or drop a fiber optic cable from the existing fiber optic network or more specifically from the nearest telephone pole or ground-based terminal to the ONT, and to conduct any necessary wiring within the house. Reducing the installation time would reduce cost for the service providers. Another possible benefit for a reduction in the installation time may be improved customer satisfaction. Also, the wait time between when a customer requests a hook up and when the service provider could be at the customer's house to install the fiber optic cable may be reduced if the installation time is reduced.

Although many customers would prefer for the service provider to do the installation while the customer is not home, the presence of the customer is usually required to indicate to the service provider where the customer prefers to have the ONT mounted.

BRIEF DESCRIPTION OF THE SEVERAL VIEWS OF THE DRAWING(S)

FIG. 5a illustrates a 180 degree drill bit extension consistent with an exemplary embodiment;

FIG. 5b illustrates a screw thread driver consistent with an exemplary embodiment;

FIG. 6a is a perspective view of a frame portion and an insert portion of a wall plate according to an exemplary embodiment;

FIG. 6b is a perspective view of a wall plate having an insert portion within an opening in a frame portion according to an exemplary embodiment;

FIG. 6c is a side view of an insert portion and a frame portion according to an exemplary embodiment;

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Service providers, such as telephone and cable companies, may deliver services to their customers through networks. The networks may include interconnected branches and supply lines of telephone wires, co-axial cables, fiber optic cables, and other type of transmission lines depending on the service. The services may include telephone, television, Internet access, and other media or communication deliveries.

To add a house or other building to the network, the service provider may install a transmission line from the existing network to a terminal device located near or at the house or other building. For example, in a fiber optic network, the service provider may run or drop a fiber optic cable from the existing network to an optical network terminal ("ONT") installed near, at, or in the house. More specifically, the new fiber optic cable may extend from a splicing component of the network mounted to or supported by a nearby telephone pole or a ground-based terminal to the ONT. Exemplary embodiments relate to methods and devices for the installation of the fiber optic cable to a house or other building structure. Although embodiments are described herein as delivering fiber optic cable to a house, it is understood that a house is only one example of a building structure in which the fiber optic cable may be delivered. Other examples include other residential building structures such as apartments or commercial structures such as offices and stores.

Figure 1:
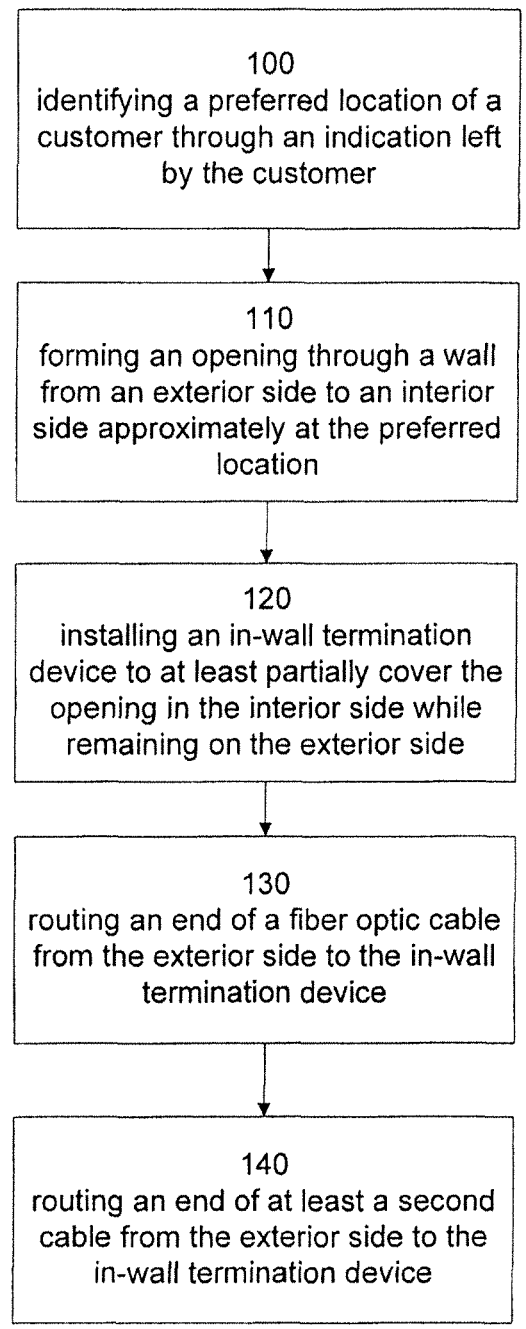
FIG. 1 illustrates a flow chart according to an exemplary embodiment.

For example, according to an exemplary embodiment illustrated in FIG. 1, a method for installing a fiber optic cable to a house is provided. A home owner or other resident, referred to hereafter as the "customer," may leave an indication at a particular location on an outer or exterior wall of the house in which the customer prefers the fiber optic cable to enter through, referred to herein as the preferred location. This operation may occur without the presence of a technician from the service provider. In other words, the customer does not have to wait or take time off from work to meet with someone from the service provider. The method may include a technician from the service provider identifying the preferred location of the customer through the indication made by the customer 100, forming an opening through the wall from an exterior side to an interior side approximately at the preferred location 110, and installing an in-wall termination device in the opening from the exterior side 120. The operation of installing the in-wall termination device may occur without the technician requiring access to the interior of the house. Therefore, as with the operation of the customer indicating the preferred location, the customer does not need to wait or take time off from work in order to allow someone from the service provider access to the interior of the house or to allow someone from the service provider access to the house when the customer is not home.

As explained further below, the operation 120 of installing the in-wall termination device may further include inserting a wall plate through the opening from the exterior side to the interior side, attaching the wall plate against an interior surface of the wall, and installing a duct element that defines a conduit through which to at least partially run a fiber optic cable 100. And as further illustrated in FIG. 1, the method may also include routing an end of a fiber optic cable from the exterior side at least partially through the conduit to the wall plate 130 and routing an end of at least a second cable extending from the exterior side at least partially through the conduit to the wall plate 140.

A customer may indicate the preferred location through various methods and devices. For example, the customer may mark the outside or exterior side of the wall at the preferred location with chalk, paint, label, or other type of marker. The mark may vary from an "X" or may include other indicia, such as a prearranged identifier to help ensure that the technician identifies the proper marking left by the customer.

Figure 2:
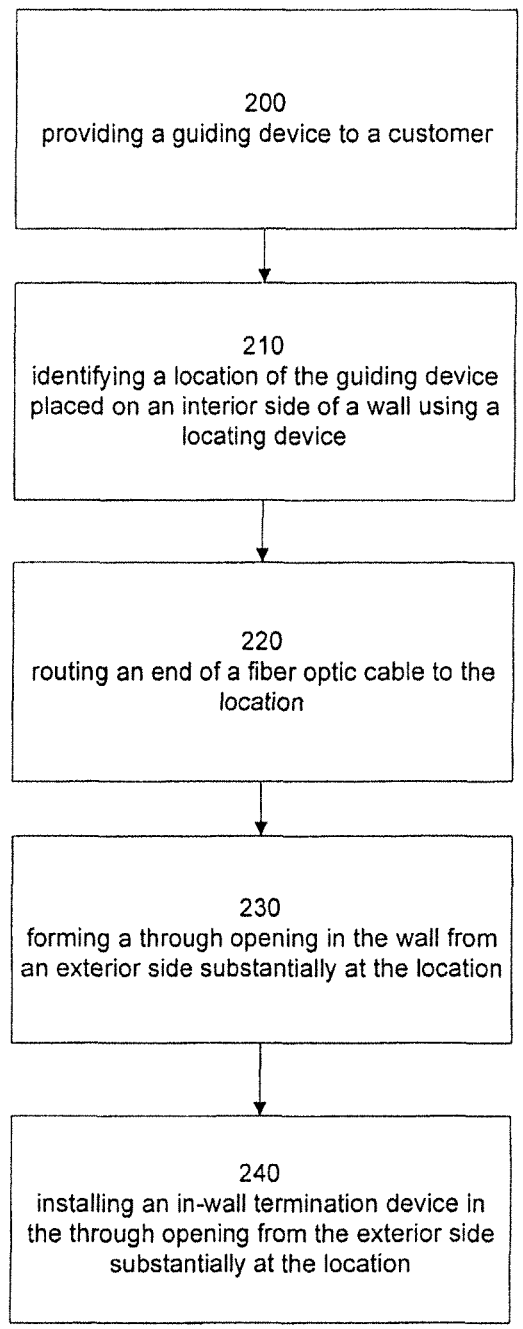
FIG. 2 illustrates a flow chart according to another exemplary embodiment.

According to another embodiment and as illustrated in FIG. 2, the method may include providing a guiding device to a customer 200 and identifying the location of the guiding device placed on an interior side of a wall using a locating device 210. The method may further include routing an end of a fiber optic cable to the location 220, forming a through opening in the wall from an exterior side substantially at the location 230, and installing an in-wall termination device in the through opening from the exterior side 240.

In this embodiment, the customer may mark the interior side of the exterior wall at the preferred location, which may allow the customer to be more accurate and to better understand the accessibility and the aesthetics of the preferred location from inside the house. The marking of the interior side of the wall may be done by a marker or other device that is detectable from the exterior side of the wall.

Figure 3:
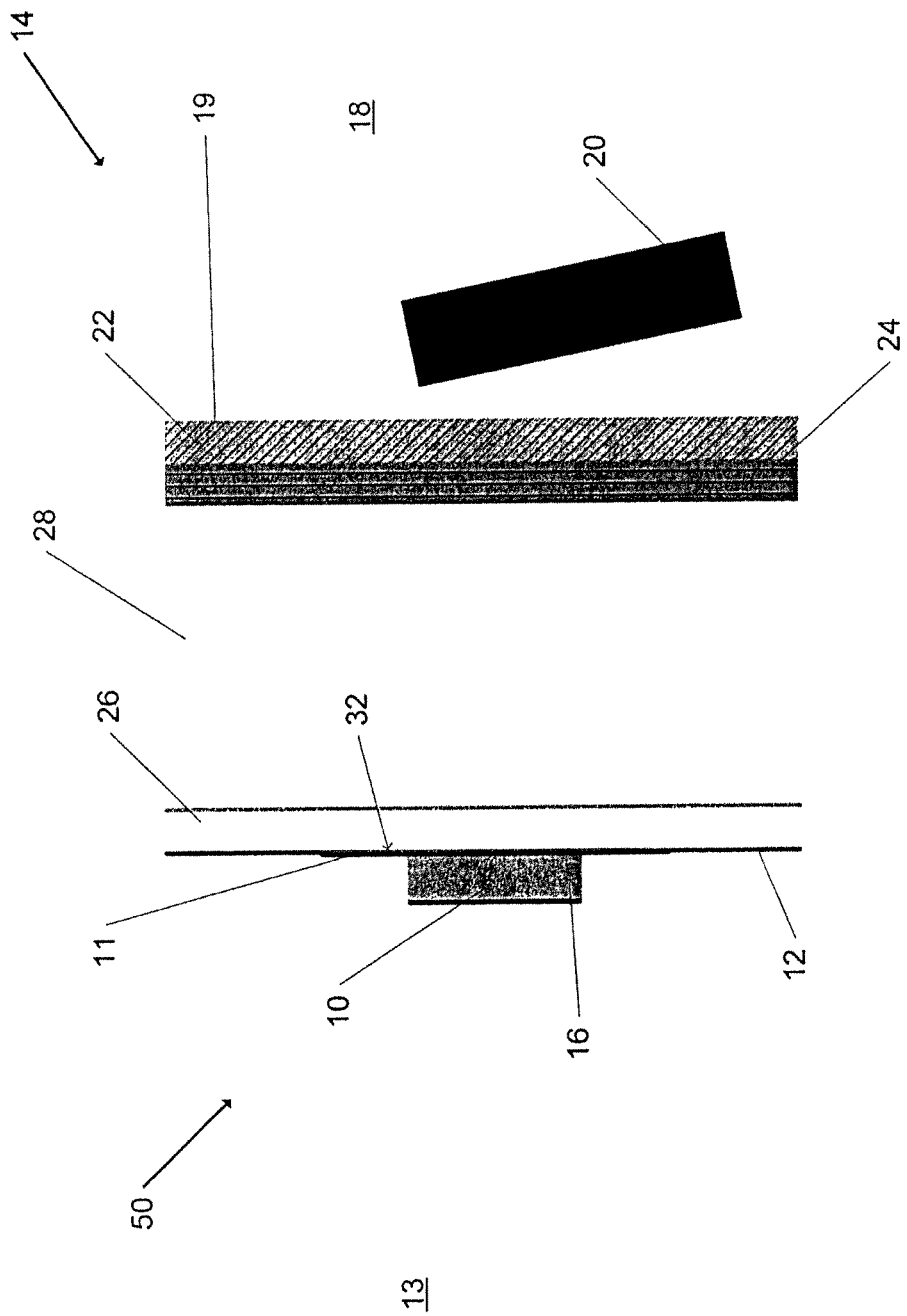
FIG. 3 illustrates a cross-section of an exterior wall, a guiding device, and a locating device according to an exemplary embodiment.

In particular, according to the exemplary embodiment and as illustrated in FIG. 3, the customer may place a guiding device 10 to the preferred location 50 along an interior surface 12 of an exterior wall 14 of the house. The guiding device 10 may include a sticker or label portion 11 for attaching the guiding device to the interior surface 12. The guiding device 10 may include or otherwise be associated or attached with a magnetic material, RFID transponder, radio transmitter, or other detectable element that allows the guiding device 10 to be detected through the exterior wall 14, referred to as a first locating element 16. After the guiding device 10 is placed at the preferred location 50, the technician from the service provider may detect the guiding device 10 and thus the preferred location 50 from the exterior side 18 of the exterior wall 14 using a locating device 20. The locating device 20 may vary depending on the guiding device 10. For example, the locating device 20 may include a metal detector, an RFID reader or transceiver or other device configured to detect or otherwise work or communicate with the first locating element 16 of the guiding device.

The service provider may provide guidelines, instructions, or recommendations to the customer for selecting the preferred location. For example, recommendations may include selecting the preferred location to have at least a minimum distance from an existing electrical outlet or other wiring or plumbing components within the house or from studs or other supports in the exterior wall. To help the customer locate studs, the guiding device may include a magnetic sensing element, like a stud finder. Moreover, the guiding device may include an indicator, e.g., a light or an audio tone generator, to warn the customer that the guiding device is near a stud. Another recommendation may be that the preferred location be at least a minimum height from the floor, e.g., 12-18".

The guidelines, instructions, or recommendation may be provided on the guiding device. For example, instructions may be printed on the label portion. As more a specific example, the instructions may be printed on a back side of the label portion or a peel-off backing of the label portion.

In order to help the customer understand the size and look of the in-wall termination device, the size and shape of the guiding device or a portion of the guiding device may be substantially the same as a wall plate, i.e., the portion of the in-wall termination device that is visible from the interior of the house. Moreover the guiding device may include markings or other indicia such that the front side of the guiding device resembles the wall plate (e.g., the guiding device may have jacks and/or a company logo drawn onto the front side).

To assist in the identification of the preferred location, the customer may provide instructions or a description of the preferred location to help the service technician to narrow his or her search for the indication of the preferred location left by the customer, regardless of whether the indication is a mark on the interior side 13 or exterior side 18 of the exterior wall. Moreover, in some embodiments, the customer may leave a mark on both the interior side 13 and the exterior side 18 of the exterior wall. For example, a mark on the exterior side may be used to provide a general area of the preferred location and a mark (e.g., the guiding device) on the interior side may be used to provide a more specific location for the in-wall termination device.

As illustrated, the exterior wall 14 may include an outer siding layer 22, a sheathing layer 24 adjacent to the siding layer 22, and an interior drywall layer 26. The exterior wall 14 may further define a wall cavity 28 extending between the sheathing layer 24 and the drywall layer 26. And the wall cavity 28 may be at partially filed with an insulation material (not illustrated).

As stated above, the installation of the in-wall termination device may include forming a through opening, i.e., each layer may define a hole that is substantially aligned with the holes in the other layers, in the wall at the preferred location extending from an exterior surface 19 to an interior surface 12 of the wall. More specifically and as illustrated, the through opening extends from and through the outer siding layer 22 to and through the inner drywall layer 26.

Cutting through the layers 22, 24, 26 of the wall to form a through opening may be done by the technician from the exterior side 18 using one or more cutting tools, such as a drill, sabre saw, a circular saw, a keyhole saw, a reciprocating saw, a drywall saw, a drywall knife and/or a utility knife. The technician may also remove or reposition some of the insulation material in order to provide access to the inner drywall layer 26 and to complete the through opening.

Forming the through opening may further include operations for reducing the amount of dust and debris (e.g., portions of the drywall layer) that may fall onto the floor in the interior 13 of the house due to the cutting of the layers 22, 24, 26, especially the inner drywall layer 26. In other words, the method may include operations to reduce the possible mess left inside the house from installing the in-wall termination device. For example, while cutting the inner drywall layer 26, the cutting tool may be equipped with a vacuum apparatus for collecting dust or other debris. The vacuum apparatus may help to reduce the dust or debris created from cutting into the drywall layer 26 that falls into the interior 13 of the house. In addition to or instead of the vacuum apparatus, after cutting through the exterior wall 14, including the drywall layer 26, the technician may extend a mirror or camera through the through opening in the exterior wall 14 and into the interior 13 of the house in order to view the floor beneath the newly created hole in the drywall layer 26. With the assistance of the mirror or camera, the technician may extend a vacuum apparatus through the hole and position the vacuum apparatus near the floor beneath the hole to vacuum at least some of the dust and debris that fell to the floor during the cutting operation. The mirror or camera may help to minimize the likelihood of the technician accidentally vacuuming up something other than the dust or debris.

Depending on the cost of the guiding device and/or difficulty of detecting the guiding device, the technician may try to cut to but not through the guiding device attached to the interior surface. For example, the guiding device may be considered disposable and the technician may be indifferent on whether the guiding device is damaged or cut during the cutting operations. However, in some embodiments, the guiding device may be considered reusable and the technician may try to not damage or cut the guiding device during the cutting operation. The guiding device may be configured to receive and respond to a radio signal. For example, the guiding device may be configured to respond to a radio signal by at least partially moving or disengaging from the wall during the cutting operation to help protect the guiding device from being damaged.

Referring back to FIG. 3, the technician may detect when he or she has cut or drill to the guiding device 10 attached to the interior surface 12 of the exterior wall 14 through a second locating element 32 of the guiding device 10. For example, the second locating element 32 may comprise a brightly colored outer surface of the label portion that may become visible to the technician once he or she has cut or drilled to the guide device 10. As another example, the second locating element 32 may comprise a hardened material, such as a steel plate, that either creates a noise or increase resistance to the cutting tool when the cutting tool contacts the second locating element 32. The noise or increase resistance created by the interaction from the cutting tool and second locating element 32 may provide notice to the technician that he or she has reached the guiding device 10. Other examples of locating elements may include other touch-sensitive mechanisms that react to contact from the cutting tool. Typically, the second locating element is on the side of the guiding device that faces the wall and will be first contacted by a drill, saw blade, or the like during the formation of a through opening.

After the through opening is formed, the in-wall termination device 34 may be installed. The in-wall termination device 34 may include a wall plate 36. The wall plate 36 may be inserted through the through opening and beyond (e.g., interior of) the inner drywall layer 26. The wall plate 36 may be rotated or turned on its side in order to get the wall plate 36 to fit through the holes in the layers 22, 24, 26, including the opening in the drywall layer 26. Once through the hole in the drywall layer 26, the wall plate 36 may be rotated back such that it is substantially parallel to the interior surface 12 of the wall and then held against the interior surface 12 such that the wall plate 36 surrounds the hole in the drywall layer 26.

Figure 4:
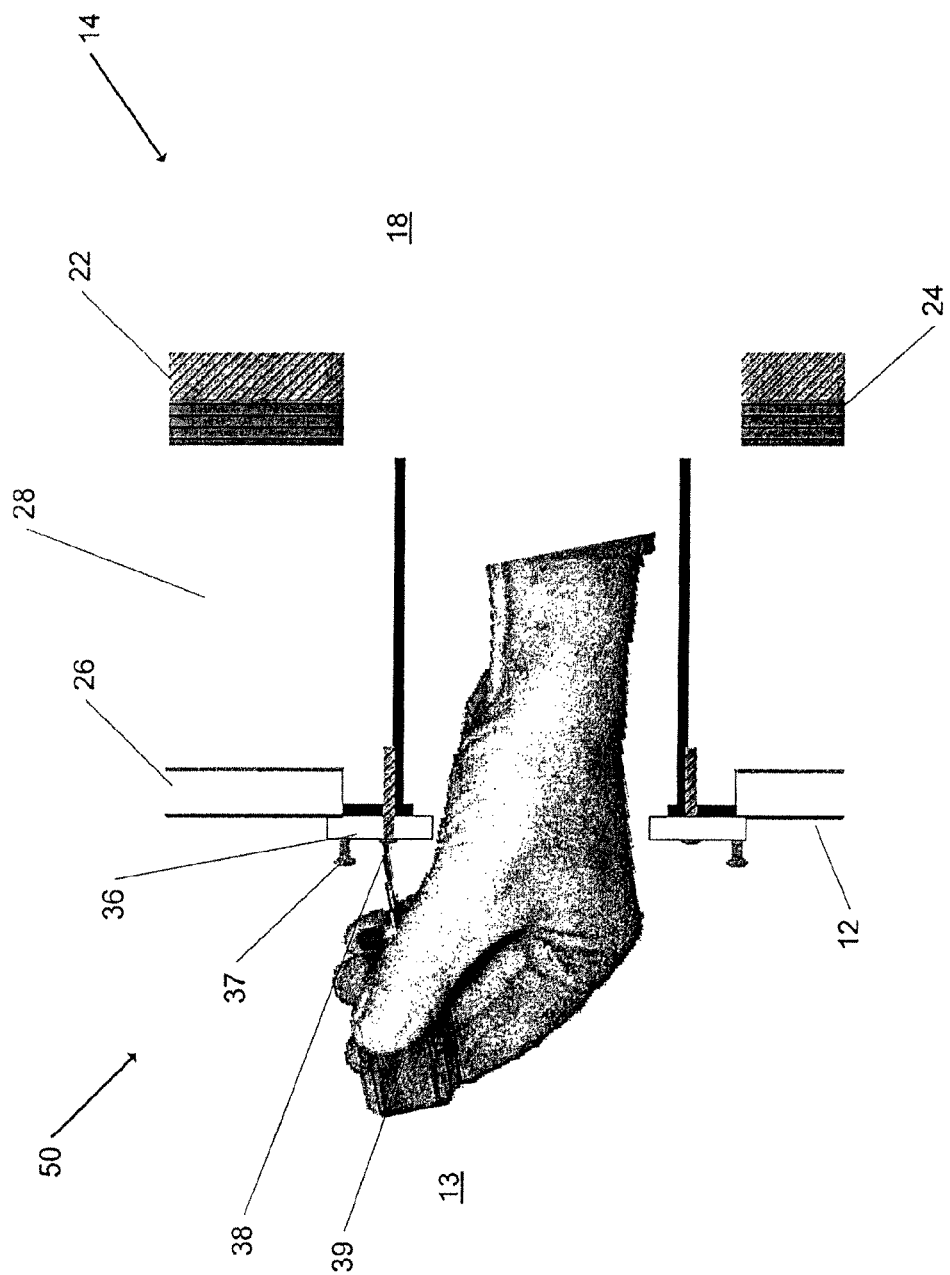
FIG. 4 illustrates the cross-section of FIG. 3 and the installation of a wall plate and a duct member according to an exemplary embodiment.

As shown in FIG. 4, the wall plate 36 may be supported against the interior surface 12 of the exterior wall 14 through a plurality of fasteners 38 (e.g., screws, bolts, nails, etc. . . . ). In addition to or instead of the fasteners 38, an adhesive may be employed. Specifically, an adhesive may be applied to a back side of an outer periphery region of the wall plate 36 such that when the wall plate 36 is held against the interior surface 12 of the exterior wall the adhesive forms a bond between the wall plate 36 and the exterior wall 14.

One or more of the fasteners 38 may be installed such that the head of the fastener faces the interior of the house, which allows for easier access to the fasteners 38 for the customer. To help the technician install the fasteners 38 from the exterior of the house, the technician may use a 180 degree drill bit extension 86 (illustrated in FIG. 5*a*) or similar device that allows a drill bit to drive a screw at an angle, such as a 45 degree or 90 degree angle from the drill. Another example of a tool that may be used to install one or more of the fasteners is a screw thread driver 88 (illustrated in FIG. 5*b*), i.e., a drill bit configured to engage the threads of a screw that is alongside the drill as the drill bit turns. In yet another example, the technician may reach his or her hand through the wall and an opening defined within the wall plate and use a manual or power screwdriver 39 to tighten a fastener 38 back toward the wall 14 as illustrated in FIG. 4.

As illustrated in FIG. 6*a*, the wall plate 36 may include a frame portion 82 and an insert portion 84. The frame portion 82 may define an outer periphery of the wall plate and an opening 83. The frame portion 82 may be attached to the interior surface 13 and the opening 83 may provide access to the technician to reach his or her hand or tool through the frame portion 82 and get to the fasteners 38 as illustrated in FIG. 4. The insert portion 84 may be configured to close the opening 83 and provide a surface for supporting jacks and/or connectors of the wall plate. The insert portion 84 may be configured to fit into the opening 83 as illustrated in FIG. 6*b* such that a front surface of the insert portion is substantially flush with a front surface of the frame portion. The insert portion 84 may be held within the opening through latches, snaps, slots, tabs, or other complementary shapes defined along the edges in the insert portion 84 and the frame portion 82. As another example, the insert portion 84 may be at least partially held through a press-fit arrangement between the two portions 82, 84. Or yet as another example, an adhesive may be employed. Rather than having the insert portion 84 held within the opening, the insert portion 84 may be larger than the opening 83 such that insert portion 84 can cover the opening 83 and be held against a back surface 85 of the frame portion 82 as illustrated in FIG. 6*c*. The insert portion 84 may be held against the back surface 85 through one or more fasteners and/or an adhesive.

Figure 7:
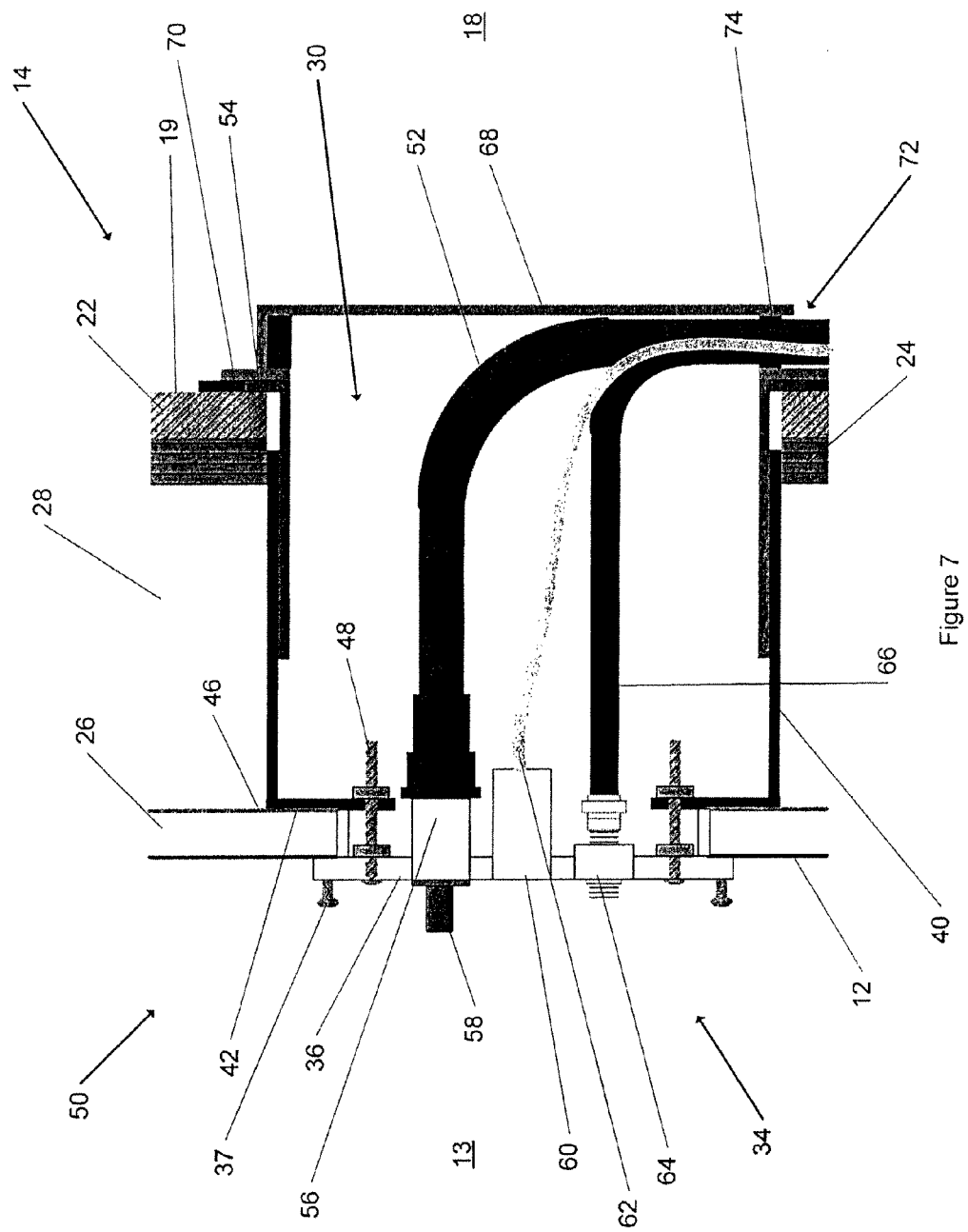
FIG. 7 illustrates an in-wall termination device according to an exemplary embodiment.
Figure 8:
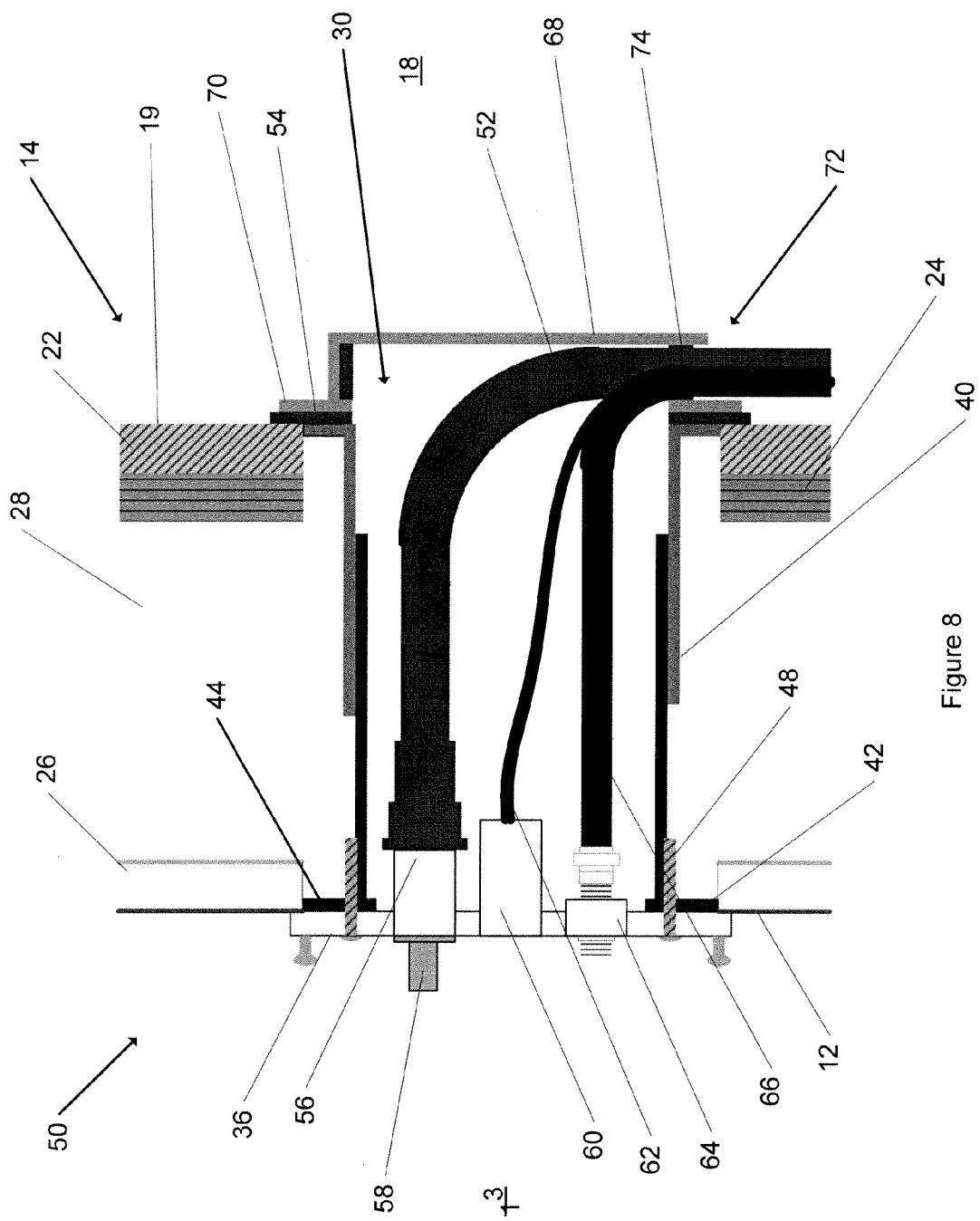
FIG. 8 illustrates an in-wall termination device according to an exemplary embodiment.
Figure 9:
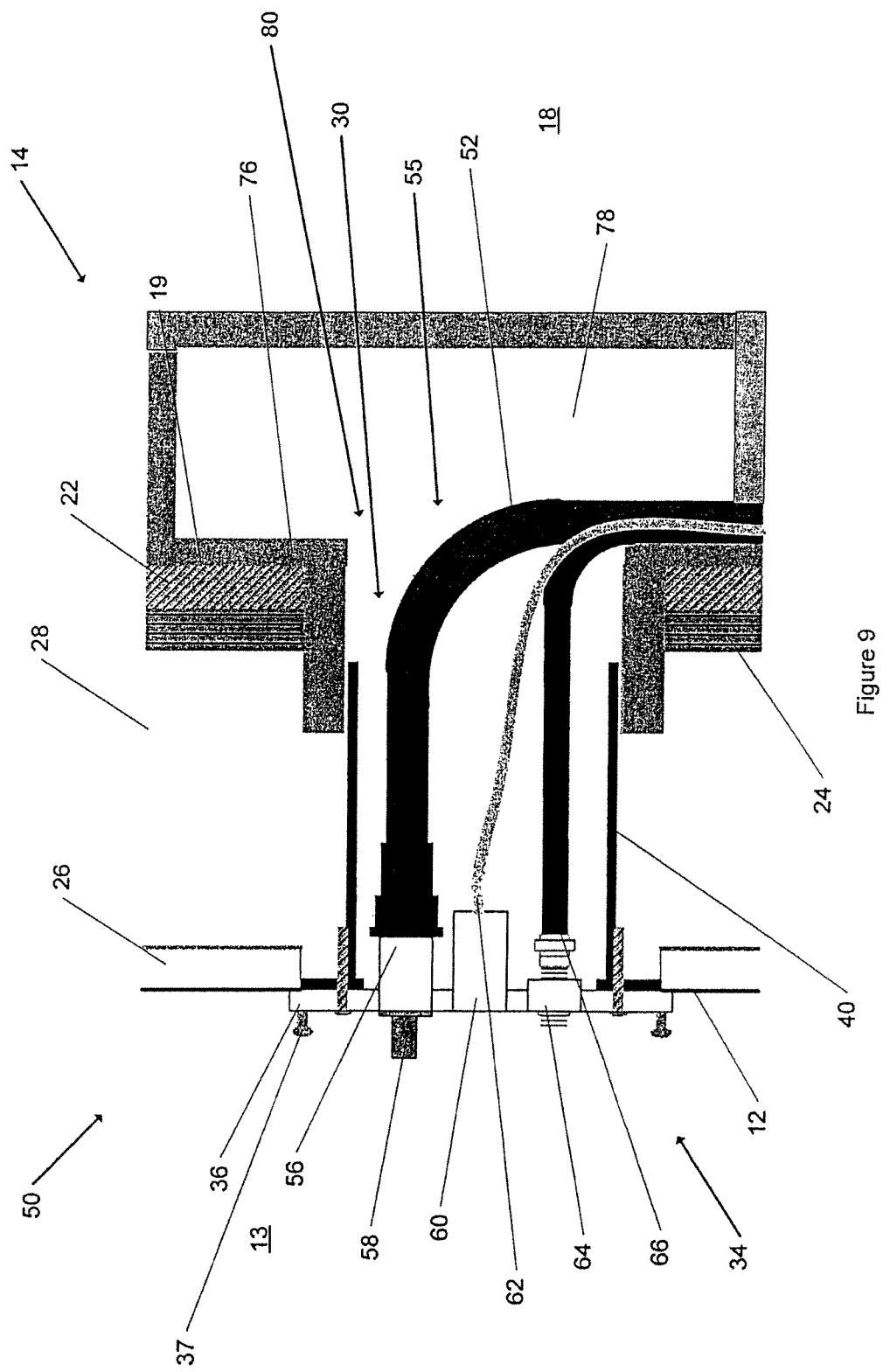
FIG. 9 illustrates an in-wall termination device according to another exemplary embodiment.

Referring to FIGS. 7 through 9, after installing the wall plate 36 of the in-wall termination device 34, the technician may install a duct element 40 of the in-wall termination device 34, such as a blue plastic electrical box with or without an extension, i.e. the length of the electrical box may be adjustable to correspond to the width of the wall. In general, the duct element 40 extends from the wall plate 36 to the exterior surface 19 of the exterior wall 14 and defines a conduit 30 in which to run a fiber optic cable 52 at least partially through. The duct element 40 may include a front flange 42 extending from a front end of the duct element. The front flange may be positioned against the back side 44 of the wall plate as illustrated in FIG. 8 or an exterior side 46 of the drywall layer as illustrated in FIG. 7. One or more fasteners 48 may be used to help hold the front flange 42 relative to the wall plate 36. The duct element 40 may also include a back flange 54 extending from a back end of the duct element. The back flange 54 may be positioned against the exterior surface 19 of the siding layer as illustrated in FIG. 7 or positioned such that the flange is substantially flush with the exterior surface 19 as illustrated in FIG. 8. One or more fasteners (not illustrated) may be used to help hold the back flange relative to the exterior surface of the siding layer. Although the duct element may help to define a conduit, in some embodiments, the in-wall termination device may not include a duct element. In such embodiments, the openings through the layers of the wall form the conduit.

The fiber optic cable 52 may be routed through the duct element 40 to the wall plate 36. The wall plate 36 may include one or more connection points (e.g., jacks, connectors, adapters, etc. . . . ) for receiving one or more fiber optic cables or additional cables (e.g., coaxial cable, telephone cable). For example according to the embodiment illustrated in FIG. 7, the wall plate 36 may include an exterior OptiFit® connector 56 for receiving a pre-connectorized end of the fiber optic cable 52. The exterior OptiFit® connector 56 may be in communication with an interior SC connector 58 of the wall plate. The interior SC connector 58 may be for receiving an end of a fiber jumper, i.e, a fiber optic cable of a predetermined length, that leads to an ONT or another device within the house. The ONT may be attached to or positioned adjacent to the front face of the wall plate. For example, the wall plate may include one or two hooks 37 or fasteners extending from the front face for hanging or supporting the ONT. In another embodiment the ONT may be positioned in the wall near or as part of the in-wall termination device. In yet another embodiment, the wall plate may be part of the ONT such that the fiber optic cable 52 may be routed directly from the existing network to the ONT in the wall.

Other embodiments may include FC, ST, LC, other standardized or proprietary connectors for terminating the fiber optic cable coming in from the outside network and connecting to a fiber jumper that extends at least partially within the house or connecting to the ONT. As used herein, an "interior facing connector" is a connector that extends toward the interior of the house, while an "exterior facing connector" is a connector extending toward the exterior of the house. An interior facing connector may provide for a test point within a network. For example, the interior SC connector 58 may be used as a test point to determine whether a break or degradation in the network is before or after the in-wall termination device. Similarly, an externally facing connector may be a test point accessible from the exterior of the house.

In addition to one or more fiber optic cables, the in-wall termination device 34 may accommodate various other types of cables. For example and as illustrated, the wall plate 34 may include a telephone jack 60 for receiving an end of a telephone cable 62 extending from a network interface device ("NID"). As another example and as illustrated, the wall plate 36 may include a coaxial cable jack 64 for receiving an end of a coaxial cable 66.

As illustrated in FIGS. 7 and 8, the in-wall termination device 34 may include a back cover 68 to substantially extend across a back opening of the conduit 30 and the hole in the siding layer 22. The back cover 68 may include a flange 70 extending around an outer periphery of the cover and one or more fasteners (not illustrated) may be used to hold the flange 70 against the siding layer 22. The back cover 68 may define one or more openings 72 to allow the fiber optic cable 52 and other cables 62, 66 to extend from outside the house, through an opening in the back cover 68 and through the conduit 30 to the wall plate 36. The back cover 68 may further include one or more gaskets 74 to help seal the openings 72 even with one or more cables extending through the openings.

Sealing the openings may help to weatherize the in-wall termination device, as well as protect against insect infiltration. The back cover may also be formed of a material that helps to insulate against heat loss. Moreover, insulation material may be positioned within the conduit to add additional insulation.

As illustrated in FIG. 9, the back end of the conduit member 30 may be in contact with a storage container 76. The storage container 76 may be attached to the exterior wall 14 and define an interior space 78 for storage. The storage container 76 may also define a first opening 80 that aligns at least partially with the back opening 55 of the conduit member 30. The interior space 78 may be used to store fiber optic cable 52, or more specifically, slack in the fiber optic cable (e.g. a folded portion of the fiber optic cable). Therefore, in the embodiment illustrated in FIG. 9, a fiber optic cable 52 may extend from the outside into a second opening of the storage container 76 and then may extend in a folded manner within the interior space 78 of the storage container and then into the conduit member 30 through the first opening of the storage container 76 and the back opening 55 of the conduit member 30.

Although the in-wall termination device is generally described above as being installed by a technician from the service provider while the technician is standing on the exterior side of the house or building, in some embodiments the technician or customer may install at least a portion of the in-wall termination device from the interior side of the house or building.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
    detecting from an exterior side of a wall a position indicator affixed to an interior side of the wall
    discerning an approximate exterior position corresponding to the position indicator; and
    forming an installation aperture at the approximate exterior position, the installation aperture extending from the exterior side of the wall to the interior side of the wall.

2. The method according to claim 1, further comprising:
    installing an in-wall termination device at least partially through the installation aperture.

3. The method according to claim 2, wherein the in-wall termination device comprises:
    a wall plate attached to an interior portion of the wall, wherein the wall plate includes at least a first exterior facing connector configured to receive an end of a first cable extending from the exterior side of the wall and at least a first interior facing connector in communication with the first exterior facing connector; and
    a duct element extending from the wall plate toward the exterior side of the wall and defining a conduit through which at least one cable may extend.

4. The method according to claim 3, wherein the in-wall termination device further comprises:
    a storage container defining an area configured for storage of at least one cable.

5. The method according to claim 1, wherein the detecting from an exterior side of a wall a position indicator comprises:
    detecting an electromagnetic signature associated with the position indicator.

6. The method according to claim 1, wherein the position indicator is configured to react to contact from a cutting tool used to form the installation aperture.

7. The method according to claim 1, further comprising:
    operating a vacuum apparatus to remove debris associated with forming the installation aperture from the interior side of the wall.

* * * * *